July 3, 1928.
M. G. P. PHILLIPS
1,676,047
MACHINE FOR CLEANING THE STEMS OF TOBACCO LEAVES
Filed Nov. 11, 1927
3 Sheets-Sheet 1
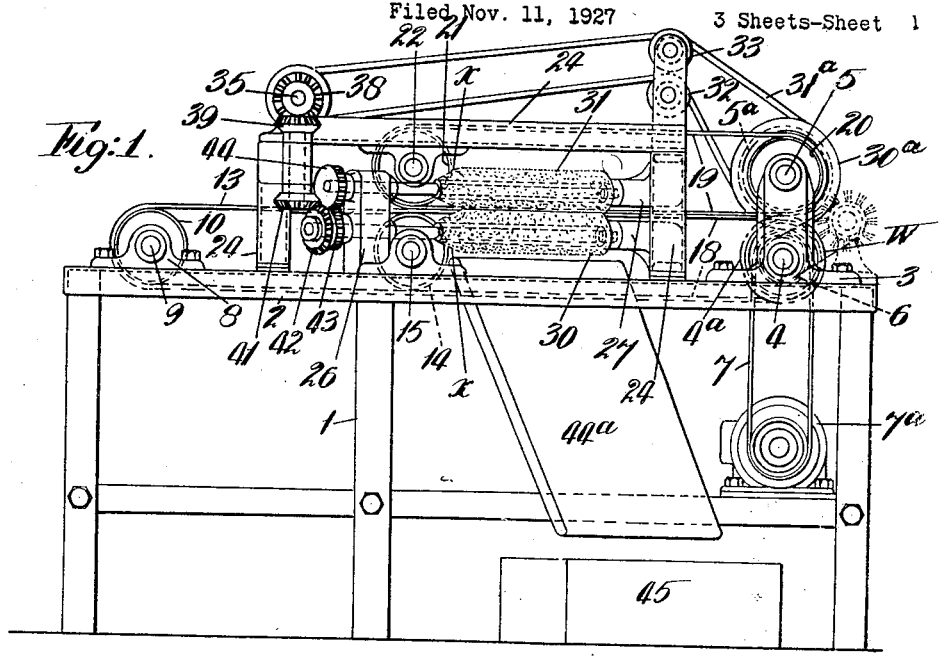
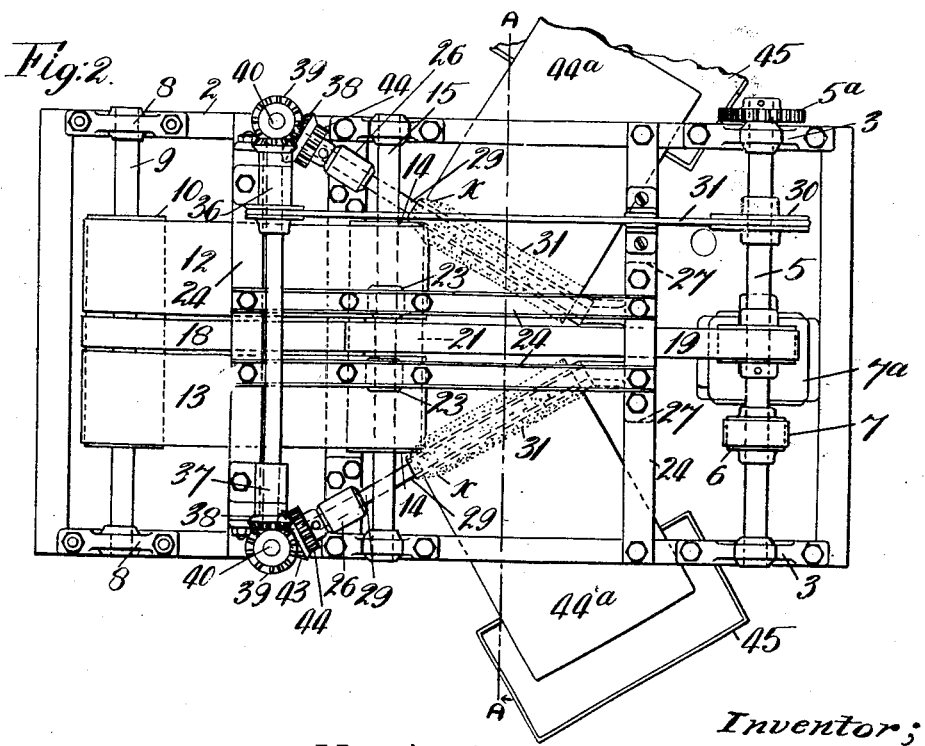
Inventor;
Morris Godfrey Philip Phillips,
By his atty Harold J. Penner July 3, 1928.

M. G. P. PHILLIPS 1,676,047

MACHINE FOR CLEANING THE STEMS OF TOBACCO LEAVES

Filed Nov. 11, 1927 3 Sheets-Sheet 2

Inventor;
Morris Godfrey Philip Phillips,
By his Atty,
Harold D. Penney

July 3, 1928. 1,676,047
M. G. P. PHILLIPS
MACHINE FOR CLEANING THE STEMS OF TOBACCO LEAVES
Filed Nov. 11, 1927 3 Sheets-Sheet 3
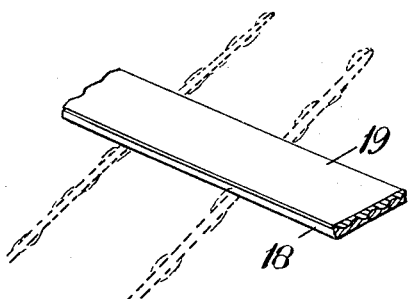
Fig: 5.
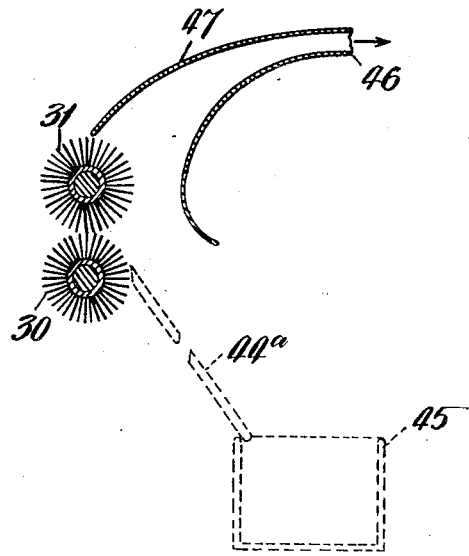
Fig: 6
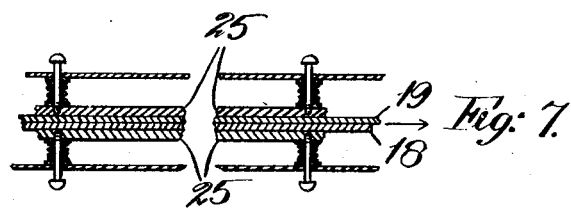
Fig: 7.
Inventor;
Morris Godfrey Philip Phillips,
By his Att'y
Harold D. Penney Patented July 3, 1928.

1,676,047

UNITED STATES PATENT OFFICE.

MORRIS GODFREY PHILIP PHILLIPS, OF LONDON, ENGLAND.

MACHINE FOR CLEANING THE STEMS OF TOBACCO LEAVES.

Application filed November 11, 1927, Serial No. 232,591, and in Great Britain April 30, 1927.

This invention relates to a machine for cleaning the stems of tobacco leaves without disintegrating the leaf or the stem.

With hand stripping and such stripping machines as are at present in use there are left at the butt end of the stem so called "flags", and in addition to said "flags" there may be left at different points in the length of the stem a certain amount of leaf.

The present invention has for its object to provide a machine whereby any leaf adhering to the stem after it has been through the stripping machine may be readily removed.

According to this invention the stem is held in a manner such as to leave a portion thereof exposed upon each side of the holding means, and whilst so held is caused to pass between rotary brushes acting upon the exposed portions of the stem and by which any tobacco remaining upon said stem is removed.

In order that the invention may be the better understood drawings are appended in which:—

Fig. 1 is a side view of a machine according to this invention.

Fig. 2 is a plan.

Fig. 5 is a perspective view showing more clearly means for holding the leaves during the stripping operation.

Fig. 6 is a sectional view showing certain details.

Fig. 7 is a sectional view showing other details.

Figure 3:
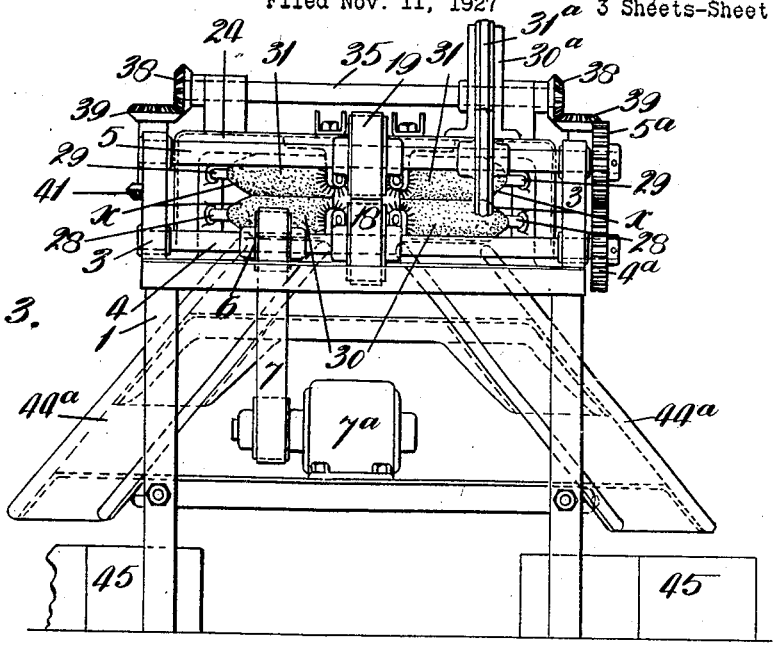
Fig. 3 is an end view.
Figure 4:
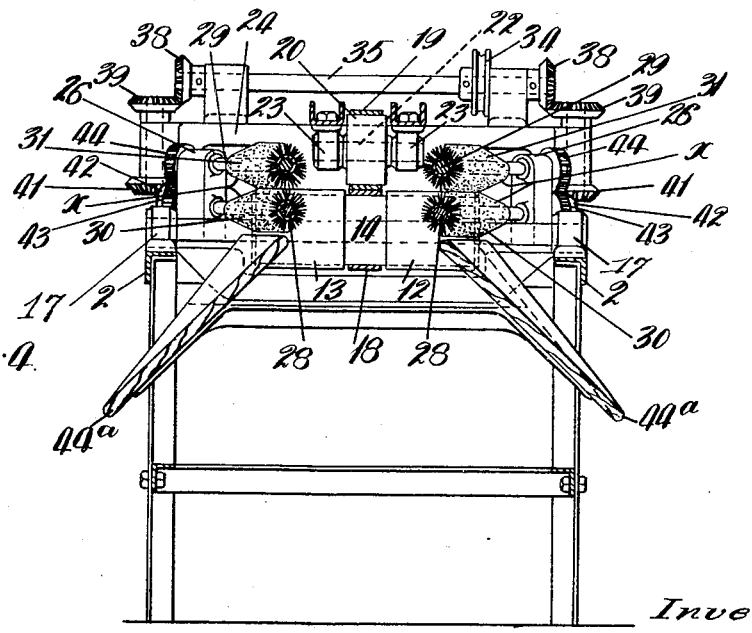
Fig. 4 is a transverse section on line A—A Fig. 2.

Referring to the appended drawings, 1 indicates generally the frame of the machine the upper members 2 of which are provided with brackets 3 disposed at one end of and transversely of said frame, said brackets supporting two shafts 4 and 5 arranged one above and parallel to each other. Secured to the lower shaft is a pulley 6 receiving motion by a belt 7 from an electric motor 7ª. The shafts 4 and 5 are operably connected by means of the toothed wheels 4ª 5ª respectively connected to shafts 4 and 5.

Mounted in brackets 8 disposed at the other end of the frame 1 is a shaft 9 upon which is mounted a pulley 10 over which pass belts 12, 13, said belts also passing around another pulley 14 upon a shaft 15 supported in bearings 17 mounted upon the upper member of frame 1.

The belts 12, 13 are comparatively wide and they are so placed upon the pulleys 10, 14 as to leave a space between their inner edges for a third and narrower belt 18, said belt being supported at its other end $y$ by a pulley upon the shaft 4. 19 indicates a second narrow belt supported at one end by a pulley 20 upon shaft 5 and at the other end by a pulley 21 mounted upon a shaft 22 arranged above and running parallel to the shaft 15, said shaft 22 being carried in bearings 23 supported by the frame 24 mounted upon the main frame 1.

The contiguous surfaces of the belts 18, 19 are in contact and act to grip the stems at or near the centre of their length as shown more clearly in Fig. 5. To increase the grip upon the leaf the outer surfaces of the belts 18, 19 may be undulated or corrugated as shown or otherwise treated, and in order to increase the pressure of the belts one against the other spring pressed plates such as shown at 25 Fig. 7 may be provided.

It will be noted that a sufficient length of the belts 12, 13 and 18 are accessible, the stems being placed by hand thereon and conveyed thereby to a position such that they pass between and are held by belts 18 and 19.

Mounted in bearings 26, 27 disposed on one side of the belts 18, 19 are spindles 28, 29, said spindles being arranged one above the other and disposed in planes parallel to the plane of belts 18, 19 and carrying brushes 30, 31, the spindles being so spaced with regard to each other that the peripheries of the brushes act effectively upon the stems, their point of contact being substantially in the plane of contact of the belts 18, 19 so that the stems as they are drawn along by the belts will be drawn between the brushes. To facilitate the entry of the stems between the brushes the ends of said brushes as shown at $x$ are coned. The brushes are inclined as shown. A similar arrangement of brushes is provided upon the other side of the belts 18, 19, the inclination of each pair of brushes being towards the discharge end of the machine. Consequently the stems are acted upon from the outer ends inwards.

The speed of rotation of the brushes is such as to secure the passage of the stem between them at a speed more or less coincident with the linear speed of the belts, or in other words such that the stems remain at, or substantially at, a right angle to the line of movement of the belts.

The direction of rotation of the brushes is such that they exert a pull on the stems in a direction away from the gripping belts 18, 19.

The brushes rotate at a comparatively high speed and receive their motion from a pulley 30ª mounted upon shaft 5, a belt 31ª passing around said pulley over guide pulleys 32, 33 to a pulley 34 on a shaft 35 carried by brackets 36, 37, said shaft 35 being provided with bevel wheels 38 engaging other bevel wheels 39 mounted upon the upper ends of vertically disposed spindles 40, said spindles 40 carrying other bevel wheels 41 engaging similar wheels 42 upon the inner ends of the spindles of the lower brushes, the spindles of said brushes being provided with toothed wheels 43 engaging toothed wheels 44 upon the spindles of the upper brushes.

The tobacco as it is removed by the brushes falls on to the inclined boards 44ª down which it slides and is discharged into receptacles 45. Alternatively the tobacco may be separated from pieces of stem and collected by means of a suction pipe 46 having a hood 47 arranged so that on one side the upper edge lies closely adjacent the upper part of the periphery of the upper brush inclining upwards for a suitable distance. The opposite side of the hood being so spaced with regard to the lower brush as to leave an opening to permit the falling away of pieces of broken stem which is heavier than the tobacco, which is drawn by the suction into a suitable receptacle as shown more clearly in Fig. 6.

To facilitate the discharge of the stems a rotary brush may be provided as indicated in dotted lines at w in Fig. 1.

Obviously a series of pairs of inclined brushes may be provided to the action of which the stems are successively subjected.

If desired provision may be made for automatically feeding the stems, a convenient device for this purpose comprising a hopper through which passes a conveyor in the form of an endless belt having transverse strips or projections thereon, which strips or the like engage the stems lifting them from the hopper and depositing them on to the bands.

If desired the bands just referred to may be arranged to serve as the conveyor and pass through the hopper.

With feeding means arranged as described and shown it is found that the leaves may be laid in a loose bundle upon the exposed part of the belts 12, 13 and 18, and as they pass to the gripping belts they are more or less separated and pass one at a time between the said gripping belts.

I claim:

1. A machine for cleaning stems of tobacco leaves without disintegrating the stem or leaf comprising means for holding the stems of the leaves at or near the centre of their length, and for conveying them between pairs of rotary brushes arranged upon each side of the line of movement of the stems, said brushes being arranged to act from the outer ends of the stems inwards.

2. A machine for cleaning stems of tobacco leaves without disintegrating the stem or leaf comprising a belt, a second belt associated with said first belt, said belts gripping the stems at or near the centre of their length, pairs of rotary brushes disposed upon each side of the gripping belts, and arranged to act upon the stem from the outer ends inwards.

3. A machine for cleaning stems of tobacco leaves without disintegrating the stem or leaf comprising a belt, a second belt associated with said first belt, said belts gripping the stems at or near the centre of their length, and rotary brushes arranged in pairs upon each side of the line of travel of the stems, said brushes being inclined with respect to the belts in a manner such as to act upon the stems from the outer ends of the stems inwards.

4. A machine for cleaning stems of tobacco leaves without disintegrating the stem or leaf comprising a belt, a second belt associated with said first belt, said belts gripping the stems at or near the centre of their length, rotary brushes arranged in pairs upon each side of the line of travel of the stems, said brushes being inclined with respect to the belts in a manner such as to act upon the stems from the outer ends of the stems inwards, and said brushes being tapered at the end first engaging the stem.

5. A machine for cleaning stems of tobacco leaves without disintegrating the stem or leaf comprising a belt, a second belt associated with said first belt, said belts gripping the stems at or near the centre of their length, rotary brushes arranged in pairs upon each side of the line of travel of the stems, said brushes being inclined with respect to the belts in a manner such as to act upon the stems from the outer ends of the stems inwards, said brushes being tapered at the end first engaging the stem, and means for feeding the stems to the gripping and conveying belts.

6. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, pairs of rotary brushes disposed upon each side of the gripping belts, and arranged to act upon the stem from the outer ends inwards.

7. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, rotary brushes arranged in pairs upon each side of the line of travel of the stems, said brushes being inclined with respect to the belts in a manner such as to act upon the stems from the outer ends of the stems inwards.

8. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, rotary brushes arranged in pairs upon each side of the line of travel of the stems, said brushes being inclined with respect to the belts in a manner such as to act upon the stems from the outer ends of the stems inwards, and said brushes being tapered at the end first engaging the stem.

9. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, rotary brushes arranged in pairs upon each side of the line of travel of the stems, said brushes being inclined with respect to the belts in a manner such as to act upon the stems from the outer ends of the stems inwards, and said brushes being tapered at the end first engaging the stem, and rigid members pressing upon the belts at their point of engagement with the stems.

10. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, rotary brushes arranged in pairs upon each side of the line of travel of the stems, said brushes being inclined with respect to the belts in a manner such as to act upon the stems from the outer ends of the stems inwards, said brushes being tapered at the end first engaging the stem, and resiliently supported rigid members pressing upon the belts at their point of engagement with the stems.

11. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, and interengaging projections upon the effective surfaces of the gripping belts, pairs of rotary brushes disposed upon each side of the gripping belts, and arranged to act upon the stem from the outer ends inwards.

12. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, and interengaging projections upon the effective surfaces of the gripping belts, pairs of rotary brushes disposed upon each side of the gripping belts, and arranged to act upon the stem from the outer ends inwards, said brushes being tapered at the end first engaging the stem.

13. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, pairs of rotary brushes disposed upon each side of the gripping belts, arranged to act upon the stem from the outer ends inwards, and means for collecting the leaf removed from the stems.

14. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, pairs of rotary brushes disposed upon each side of the gripping belts, arranged to act upon the stem from the outer ends inwards, and means for separating the stem and leaf.

15. A machine for cleaning stems of tobacco leaves without disintegrating the stem or leaf comprising two belts, a third belt disposed between and in the plane of said first belts and extending beyond same, a belt cooperating with said third belt to grip the stems at or near the centre of their length, pairs of rotary brushes disposed upon each side of the gripping belts, arranged to act upon the stem from the outer ends inwards, and a rotary brush for facilitating the discharge of the stems.

In testimony whereof I have hereunto set my hand.

MORRIS GODFREY PHILIP PHILLIPS.